E. G. STAUDE.

MACHINE FOR MAKING BOX BLANKS.

APPLICATION FILED AUG. 1, 1910.

Reissued July 18, 1911.

13,273

2 SHEETS—SHEET 1.

WITNESSES
M. M. Walstrom
G. B. Sorensen

INVENTOR
EDWIN G. STAUDE
BY Paul & Paul
ATTORNEYS

E. G. STAUDE.

MACHINE FOR MAKING BOX BLANKS.

APPLICATION FILED AUG. 1, 1910.

Reissued July 18, 1911.

13,273.

2 SHEETS—SHEET 2.

WITNESSES
A. M. Walstrom
G. E. Sorensen

INVENTOR
EDWIN G. STAUDE
BY Paul Paul
ATTORNEYS

UNITED STATES PATENT OFFICE.

EDWIN GUSTAVE STAUDE, OF MINNEAPOLIS, MINNESOTA, ASSIGNOR TO E. G. STAUDE MANUFACTURING CO., OF MINNEAPOLIS, MINNESOTA, A CORPORATION.

MACHINE FOR MAKING BOX-BLANKS.

13,273. Specification of Reissued Letters Patent. Reissued July 18, 1911.

Original No. 955,713, dated April 19, 1910, Serial No. 426,214. Application for reissue filed August 1, 1910. Serial No. 575,046.

*To all whom it may concern:*

Be it known that I, EDWIN G. STAUDE, of Minneapolis, Hennepin county, Minnesota, have invented certain new and useful Improvements in Machines for Making Box-Blanks, of which the following is a specification.

My invention relates to machines for making boxes and particularly to those in which a flexible material is cut and folded to form box blanks of different dimensions.

The object of my invention is to provide a mechanism whereby the folding means can be easily and accurately adjusted to turn out a box blank of the desired dimensions.

A further object is to provide means by which the folder frames supporting suitable folding means, (not shown) can be adjusted independently of one another to adapt the machine for handling blanks of different sizes, and also to adapt the feed mechanism to the position of the glue-pot.

The invention consists generally in means which will permit the adjustment of one of the folder frames cross-wise of the machine independently of the other folder frame.

Further the invention consists in a folder frame adjusting mechanism which will permit movement of both frames without changing their relative position.

Further the invention consists in a graduated bar in connection with said folder frames.

Figure 1:
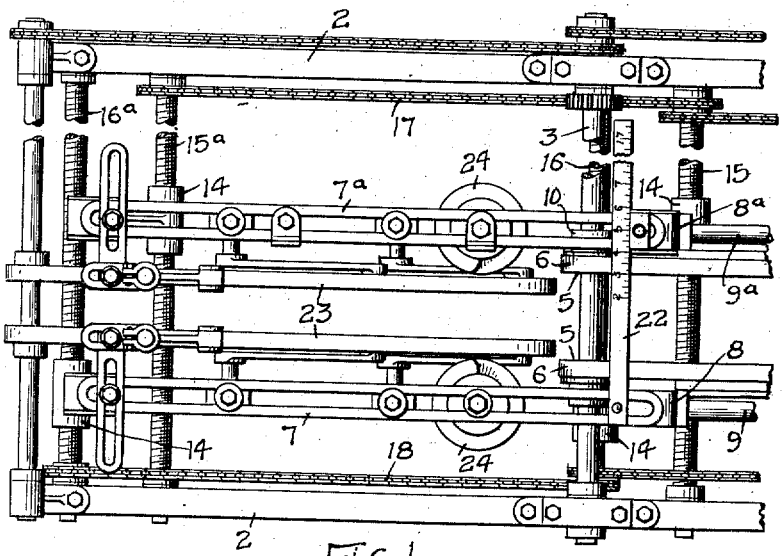
Figure 2:
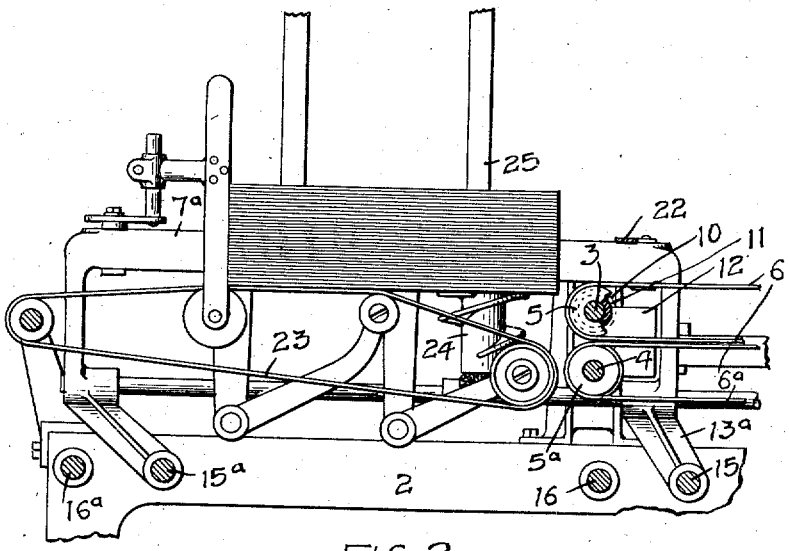
Figure 3:
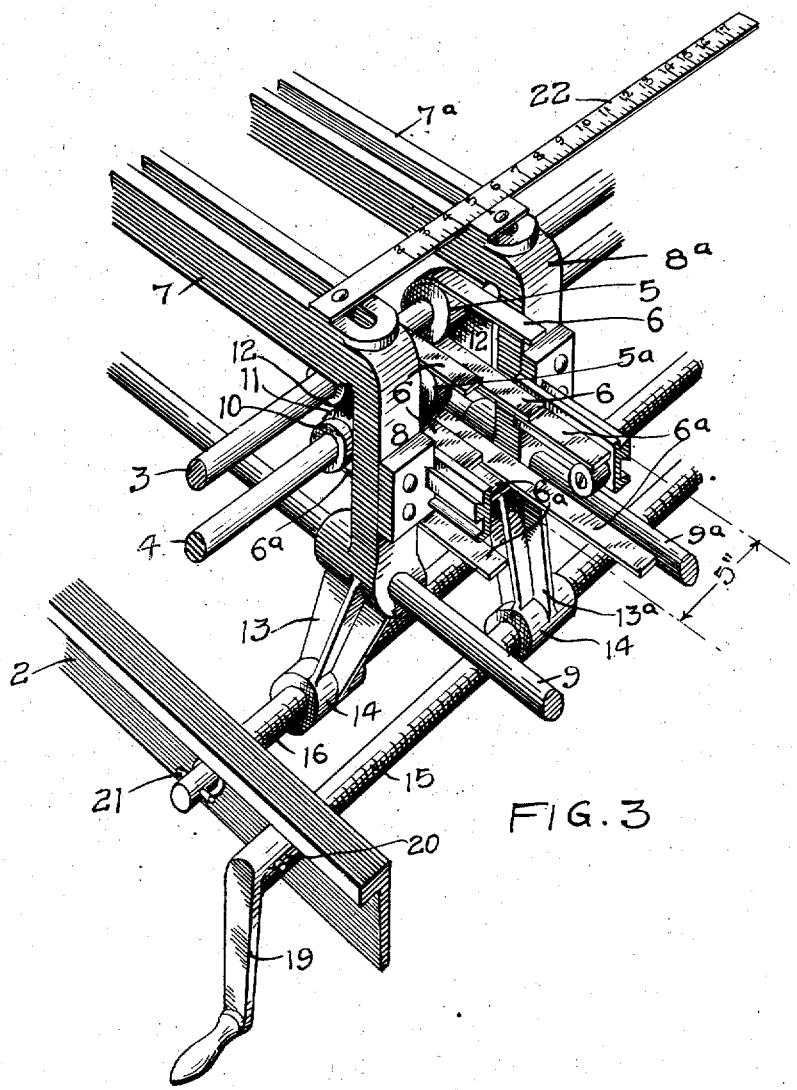

In the accompanying drawings forming part of this specification, Figure 1 is a top view of a box blank forming machine embodying my invention, Fig. 2 is a vertical sectional view of the same, Fig. 3 is a detail perspective view illustrating the mechanism by means of which the different adjustments are obtained.

In the drawing, 2 represents a suitable frame in which the operating parts of the machine are mounted.

3 and 4 are shafts carrying pulleys 5 and $5^a$ for the belts 6 and $6^a$ between which the blanks are fed. The pulleys are adapted to slide lengthwise on the shafts 3 and 4, and folder frames or brackets 7 and $7^a$ are provided, having legs 8 and $8^a$ that are journaled on longitudinal rods 9 and $9^a$. These rods are capable of transverse movement in the machine with the folder frames. The folder frames 7 and $7^a$ extend lengthwise of the machine, as indicated in Fig. 3, and support a suitable blank folding mechanism, not shown, upon forward extensions $7^b$ $7^c$ constituting parts of the folder frames, portions only of said extensions sufficient for purposes of illustration being shown. Each of the pulleys 5 and $5^a$ has a hub 10 with an annular groove 11 therein to receive the edge of a plate 12 mounted on the folder frames and the legs 8 and $8^a$ of the folder frames have hangers 13 and $13^a$ provided with hubs 14 that are interiorly threaded to receive transverse screw shafts 15 and 16 whose ends are journaled in the machine frame. I prefer to provide a pair of these screw shafts at each end of the folder frames, the pair opposite from those shown in Fig. 3 being designated by the same reference numerals with the addition of the exponant "a". These screw shafts are belted together in pairs. That is, the shaft 15 has a belt connection 17 with the shaft $15^a$ and the shaft 16 has a belt connection 18 with the shaft $16^a$ and consequently, when the crank 19 is applied to one of the shafts 15 or 16 and the shaft revolved, a corresponding movement will be imparted to the other shaft through the belt connection.

The crank preferably has a slot 20 to receive a pin 21 in the end of the shaft. The operation of these screw shafts will move the folder frames and a blank folding mechanism, not shown, supported thereby back and forth in the machine, one shaft controlling the movement of the machine on one side and for ordinary work the adjustment of this frame alone will be sufficient. I am thus able to move one of the holder frames independently of the other frame and adjust it back and forth cross-wise of the machine until the frames are set a suitable distance apart. I am also able, by applying a suitable operating means to both of the screw shafts 15 and 16 in Fig. 3, to operate both pairs of shafts and move the frames back and forth across the machine without changing their relative position. Generally it has been necessary to put a blank in the machine of the desired width and adjust the machine accordingly, or in some cases transverse scales have been provided in the bed of the machine and the frames adjusted back and forth over the scale. Such a method of adjustment, however, is objectionable, as it is necessarily slow and considerable subtraction is required to determine the proper adjustment of the machine to the width of the blank. To avoid all these objections to machines now in use I provide a bar 22 mounted at one end upon one folder frame and having a sliding bearing on the opposite frame. This bar has a series of graduations thereon by means of which the operator of the machine can accurately determine the proper position of the folder frames for the desired width of the box blank and this adjustment can be obtained very quickly and with but little physical or mental effort.

In Figs. 1 and 2 the stacking belts 23 are illustrated to which the blanks are delivered from the belts 5 and 5[a] and elevated by the spirals 24 to the receptacle 25. This portion of the machine, however, forms no part of my present invention and further and detailed description is unnecessary.

The arrangement of the folder frames and the screw shafts in pairs and their connections with said frames permits me to adjust the frame, a blank folding mechanism, not shown, supported thereby, and the belt back and forth entirely across the machine, that is, from one side to the other of the machine, and I am able to move the frames toward or from one another during such adjustment or by operating both sets of screw shafts, I can move the folder frames at any point across the machine without changing their relative adjustment. This construction, which permits the movement of the frames from one side of the machine to the other, I regard of particular importance, as it enables me to readily adapt the feed mechanism of the machine to the position of the glue pot regardless of the difference in sizes of the blanks. That is, in some cases the blanks will be so small that adjustment of the feed to the extreme side of the machine is desirable, while for larger blanks it is necessary to set the feed devices in the middle of the machine or to the extreme opposite side from the glue pot. With the apparatus above described, the machine is capable of a wide range of adjustment and is readily adapted for blanks of different sizes.

I do not wish, in this application, to be confined to the details of construction herein shown and described, as they are capable of various modifications without departing from the scope of my invention.

I claim as my invention:—

1. A flexible-blank folding machine including folder frames adapted to support a blank folding means, means for moving said frames toward or from one another transversely of the machine to adapt the machine for blanks of different sizes, pulleys connected with said frames and slidable therewith, and belts for said pulleys.

2. In a machine for folding blanks, folder frames arranged side by side and extending lengthwise of the machine and adapted to support a blank folding mechanism, transverse screw shafts operatively connected to said folder frames, said shafts being arranged in pairs, and each folder frame being connected with one screw shaft of each pair and each screw shaft having a driving connection with the corresponding shaft of the other pair on the same folder frame, and means for revolving said screw shafts to move said frames back and forth and adjust said folding means to blanks of the desired width.

3. In a machine for folding blanks, folder frames adapted to support a blank folding means, and a plurality of means coöperatively connected one with the other for transmitting power for adjusting one of said frames from one side to the other of the machine without moving the other frame.

4. In a machine for folding blanks, folder frames adapted to support a blank folding means, means for moving said frames toward or from one another transversely of the machine to adapt the machine for blanks of different sizes, transverse shafts, and pulleys slidably mounted thereon and connected with said frames, and belts for said pulleys.

5. In a machine for folding blanks, folder frames adapted to support a blank folding means, and means for adjusting said frames one at a time toward or from one another from one side toward the other of the machine to adapt them for box blanks of different sizes, and a graduated bar mounted on one frame and slidable with respect to the other frame.

6. In a machine for folding blanks, folder frames, transverse shafts and pulleys slidably mounted thereon and belts therefor, transverse screw shafts, said shafts being arranged in pairs, means operatively connected with said pulleys and also connected with one screw shaft of each pair, and each screw shaft having a driving connection with the corresponding shaft of the other pair, the revolution of said screw shafts permitting the adjustment of said pulleys and belts across the machine.

7. In a machine for folding blanks, folder frames adapted to support a blank folding means, means for adjusting one of said frames toward one side of the machine and means for adjusting the other frame independently of said first named frame between said first named frame and the other side of the machine, pulleys slidable with said frames, and belts for said pulleys, substantially as described.

8. In a machine for folding blanks, folder frames adapted to support a blank folding means, means operable from one side of the machine for adjusting one of said frames toward a side of the machine, and means operable from the same side of the machine for adjusting the other frame independently of said first-named frame between said first-named frame and the other side of the machine, substantially as described.

9. In a machine for folding blanks, folder frames adapted to support a blank folding means, a plurality of means coöperatively connected one with the other for transmitting power for adjusting one of said frames bodily throughout its length toward one side of the machine and a plurality of means coöperatively connected one with the other for transmitting power for adjusting the other frame bodily throughout its length independently of said first-named frame to any desired point between said first-named frame and the other side of the machine, substantially as described.

10. In a machine for folding blanks, folder frames adapted to support a blank folding means, and means for moving both of said frames in the same direction transversely of the machine for maintaining their relative distance apart, or one or both of them toward or from the other to change their relative distance apart, said means comprising threaded shafts with which said frames are connected to travel lengthwise thereof, certain of the shafts being operatively connected to transmit motion from one to the other for moving one frame, and other shafts operatively connected to transmit motion from one to the other to move the other frame.

In witness whereof, I have hereunto set my hand this 26″ day of July, 1910.

EDWIN GUSTAVE STAUDE.

In presence of—
G. E. Sorensen,
J. A. Byrnes.

Copies of this patent may be obtained for five cents each, by addressing the "Commissioner of Patents, Washington, D. C."